US008974699B2

(12) United States Patent
Rifflart et al.

(10) Patent No.: US 8,974,699 B2
(45) Date of Patent: Mar. 10, 2015

(54) METHOD FOR PRODUCING SYNTHESIS GASES

(75) Inventors: Sebastien Rifflart, Paris (FR); Gregory Patience, Quebec (CA); Francois Xavier Chiron, Saint-Laurent (CA)

(73) Assignees: Total Raffinage Chimie, Courbevoie (FR); IFP Energies Nouvelles, Rueil-Malmaison Cedex (FR)

( * ) Notice: Subject to any disclaimer, the term of this patent is extended or adjusted under 35 U.S.C. 154(b) by 171 days.

(21) Appl. No.: 13/580,541

(22) PCT Filed: Feb. 9, 2011

(86) PCT No.: PCT/IB2011/050553
§ 371 (c)(1),
(2), (4) Date: Aug. 22, 2012

(87) PCT Pub. No.: WO2011/104648
PCT Pub. Date: Sep. 1, 2011

(65) Prior Publication Data
US 2012/0319051 A1    Dec. 20, 2012

(30) Foreign Application Priority Data
Feb. 23, 2010 (FR) ..................... 10 00741

(51) Int. Cl.
C01B 3/22 (2006.01)
C01B 3/24 (2006.01)
C01B 3/26 (2006.01)
C01B 31/20 (2006.01)
C01B 3/44 (2006.01)
C01B 3/38 (2006.01)
C01B 3/42 (2006.01)

(52) U.S. Cl.
CPC ... *C01B 3/44* (2013.01); *C01B 3/38* (2013.01); *C01B 3/42* (2013.01)
USPC ............ 252/373; 423/437.1; 423/648.1; 423/650; 423/651; 423/652; 423/653; 423/654

(58) Field of Classification Search
USPC ............ 252/373; 423/437.1, 648.1, 650, 651, 423/652, 653, 654
See application file for complete search history.

(56) References Cited

U.S. PATENT DOCUMENTS

| 3,442,620 A * | 5/1969 | Schora, Jr. et al. ............ 423/658 |
| 4,216,199 A * | 8/1980 | Erickson ....................... 423/657 |
| 6,875,411 B2 * | 4/2005 | Sanfilippo et al. .......... 423/437.1 |
| 7,404,942 B2 * | 7/2008 | Sanfilippo et al. .......... 423/437.1 |
| 8,435,920 B2 * | 5/2013 | White et al. .................. 502/304 |
| 2010/0172825 A1 * | 7/2010 | Himmel et al. ............. 423/648.1 |

OTHER PUBLICATIONS

International Search Report of PCT/IB2011/050553 (Apr. 21, 2011).
(Continued)

*Primary Examiner* — Wayne Langel
(74) *Attorney, Agent, or Firm* — Millen, White, Zelano & Branigan, P.C.

(57) ABSTRACT

The invention relates to a cyclic process for producing synthesis gas comprising:
a first step of oxidation of an oxidizable oxygen-carrying solid;
a second purge step;
a third combustion step with production of $CO_2$;
a fourth step of production of synthesis gas;
a fifth purge step.

20 Claims, 8 Drawing Sheets

(56) References Cited

OTHER PUBLICATIONS

M. Ryden et al., "Using Steam Reforming to Produce Hydrogen with Carbon Dioxide Capture by Chemical-Looping Combustion", International Journal of Hydrogen Energy, vol. 31, No. 10 (2006) pp. 1271-1283.

H. Leion et al., "Solid Fuels in Chemical-Looping Combustion Using a NiO-Based Oxygen Carrier", Chemical Engineering Research and Design, vol. 87, No. 11 (2009) pp. 1543-1550.

L.F. De Diego et al., "Synthesis Gas Generation by Chemical-Looping Reforming in a Batch Fluidized Bed Reactor Using Ni-Based Oxygen Carriers", Chemical Engineering Journal, vol. 144, No. 2 (2008) pp. 289-298.

* cited by examiner

METHOD FOR PRODUCING SYNTHESIS GASES

FIELD OF THE INVENTION

The present invention relates to a method for producing synthesis gas, notably with capture of $CO_2$, in a chemical loop.

TECHNICAL BACKGROUND

The processes for conversion of petroleum feedstock require large quantities of hydrogen. Currently, this hydrogen is mainly produced by the SMR (Steam Methane Reforming) process, which generates large amounts of $CO_2$, the main greenhouse gas.

The method commonly used for hydrogen production is therefore the SMR process. In the SMR process, the heat required for the steam reforming reaction is supplied by combustion, which takes place in the furnace (in the presence of air). At the outlet of this furnace, the emissions of $CO_2$ are therefore necessarily diluted.

Another method is also used: this is autothermal reforming. In this case, the heat required for the steam reforming reaction is supplied in the reactor by combustion of some of the methane by injecting pure oxygen or air. In this method, the $CO_2$ must then be separated from the synthesis gas if we wish to produce hydrogen. Moreover, this method requires large quantities of oxygen.

The use of an $O_2$ carrier in methods employing circulation of solids for producing synthesis gases has also been proposed. Such a process is shown schematically in FIG. 1. These circulating bed processes are difficult to implement, especially at high pressure. Moreover, the reaction is not controlled in the so-called "fuel-oil" reactor, where the main reaction is the reaction of partial oxidation of the fuel.

Document WO-A-96/33794 describes a method using a fixed bed reactor exposed successively to a reducing gas such as methane and to an oxygen-containing gas such as air. The catalyst is selected from the pairs Ag/AgO, Cu/CuO, Fe/FeO, Co/CoO, W/WO, Mn/MnO, Mo/MoO, $SrSO_4$/SrS, $BaSO_4$/BaS and mixtures thereof. Heat transfer by the oxygen carrier is mentioned, and the heat released during oxidation of the metal can thus be used for endothermic reactions such as oxidation of the reducing gas. The hydrogen produced during the step of reduction of the solid is diluted with the other products of the reactions taking place in the reactor and notably CO, $CO_2$ and $H_2O$. To remove the $CO_2$, it is proposed to add, downstream of the reactor, a second reactor in series containing CaO that can react with the $CO_2$ to form $CaCO_3$, which can be regenerated to CaO during the oxidation step. The $CO_2$ is then diluted with the depleted air.

Document WO-A-99/11591 describes a method of autothermal methane reforming, employing 2 interconnected fluidized bed reactors, with a metal oxide circulating between them. The heat generated during the reaction of oxidation of the metal is used in the second reactor for the reaction of partial oxidation of methane: $CH_4 + 2MO_{X+1} \rightarrow H_2 + CO + 2MO_X + H_2O$ as well as the steam reforming reaction: $CH_4 + H_2O \rightarrow CO + 2H_2$ in the case when steam is co-injected with the methane into the reactor. For producing hydrogen at high pressure, both of the 2 interconnected reactors must be at the same pressure, which means compressing the air at the inlet of the first reactor. To avoid excessive energy consumption, it is proposed to integrate this system in co-generation plant equipped with a gas turbine, where a proportion of the air flow compressed by the turbine is diverted to the metal oxidizing reactor.

Document WO-A-2008/036902 describes a method similar to the preceding method, employing a fixed bed reactor submitted successively to an oxidation step and then a reduction step with the aim of converting a hydrocarbon to a gas mixture containing $CO + H_2$. The solid used here corresponds to one of the two formulae: (a) $Ce_xB_yB'_zB''O\delta$, where B=Ba, Sr, Ca, or Zr; B'=Mn, Co, or Fe; B''=Cu; 0.01<x<0.99; 0<y<0.6; 0<z<0.5; and 1<δ<2.2; (b) $Sr_vLa_wB_xB'_yB''_zO\delta$, where B=Co or Fe; B'=Al or Ga; B''=Cu; 0.01<v<1.4; 0.1<w<1.6; 0.1<x<1.9; 0.1<y<0.9; 0<z<2.2; and 3<δ<5.5). The document also proposes a variant employing circulating fluidized bed reactors.

Document U.S. Pat. No. 6,797,253 proposes an adaptation of the method described in document WO-A-96/33794 so as to be able to convert gases containing high concentrations of $H_2S$. The method described employs a fixed bed reactor, which undergoes several successive steps during which the reaction fronts progress along the reactor. During the reforming step, sulphur is fixed on nickel, forming NiS, and the nickel is regenerated during the regeneration step by oxidation with air, producing $NiO + SO_2$.

Document WO-A-00/00427 describes a method producing synthesis gas from methane and using a bed of metal oxide undergoing a reduction step and an oxidation step in succession. At the beginning of the cycle of reduction of the solid, $CO + H_2$ is not produced immediately, therefore it is proposed in this document to recycle the gases produced initially to the inlet of the reactor mixed with methane, until $CO + H_2$ is obtained in the outgoing gas mixture.

However, in all the methods described above, the $CO_2$ produced is diluted and it is therefore necessary to carry out expensive separation steps for recovering the $CO_2$.

The invention aims to remedy this drawback by providing a method for preparing hydrogen (or synthesis gas) with intrinsic capture of $CO_2$ by producing effluents with high $CO_2$ concentration.

SUMMARY OF THE INVENTION

The invention relates to a cyclic process for producing synthesis gas comprising the following successive steps:
- a first step of oxidation of an oxidizable solid that is an oxygen carrier and a thermal vector;
- a second purge step;
- a third combustion step with production of $CO_2$;
- a fourth step of production of synthesis gas;
- a fifth purge step.

According to one embodiment, the step of production of synthesis gas is a step of steam reforming and the oxygen-carrying solid is a catalyst of the steam reforming reaction.

According to one embodiment, the step of combustion and/or of steam reforming is carried out with methane.

According to one embodiment, the step of production of synthesis gas is a gasification step.

According to one embodiment, the step of combustion and/or of gasification is carried out with coal.

According to one embodiment, the process is carried out in a fluidized bed, preferably in batch mode.

According to one embodiment, the solid is combined with a thermally stable support or is mixed with such a support.

According to one embodiment, the solid contains a metal selected from the group consisting of Ni, W, Mn, Rh, Co, Sr, Ba, Pt, Fe, Cu, Mo, Pd, Ag, and mixtures thereof, preferably Ni.

According to one embodiment, the oxidation step is carried out up to a degree of oxidation above 0.8, preferably below 0.99, advantageously between 0.9 and 0.98.

According to one embodiment, the combustion step is carried out up to a degree of oxidation between 0.4 and 0.2, preferably between 0.35 and 0.25, advantageously about 0.3.

According to one embodiment, the process further comprises a step of water gas shift reaction of the carbon monoxide resulting from the fourth step of production of synthesis gas, to a mixture of $CO_2$ and $H_2$.

According to one embodiment, the process further comprises a step of purification of $H_2$, in particular by pressure modulated adsorption.

According to one embodiment, the process further comprises recycling of $CO_2$ to the combustion step; the combustion step preferably having the same duration as the step of production of synthesis gas.

According to one embodiment, the process further comprises a step of drying of the gases resulting from the combustion step.

According to one embodiment, the steps of the process are carried out at roughly the same pressure, preferably at a pressure from 1 to 150 bar, advantageously from 20 to 100 bar.

According to one embodiment, the process further comprises at least one step of heat recovery from the effluents from the reactor.

According to one embodiment, the process is carried out continuously in a plurality of reactors in parallel.

The method according to the invention makes it possible to produce hydrogen, notably from methane, with intrinsic capture of $CO_2$. Once dried, if necessary, the gas resulting from the combustion step consists only of $CO_2$; the latter can then be compressed and sent to storage without any additional process for its capture.

In the invention, the reaction of oxidation is separated completely from that of steam reforming.

The invention is based on the use of one and the same solid as oxygen carrier, as thermal vector and, in the case of steam reforming, as catalyst. The oxidation step is highly exothermic, and generates the heat required for the highly endothermic SMR reaction (step 4). This heat is carried directly by the solid that will perform the role of catalyst in step 4. This same solid can also carry the oxygen required for step 3 (combustion), which makes it possible to carry out combustion without the presence of nitrogen ($N_2$) and therefore produce concentrated $CO_2$.

The invention differs from the prior art by division of the reduction step into 2 steps: a step during which the reaction of complete combustion is promoted and a step during which the steam reforming reaction is promoted. This division makes it possible to obtain, on the one hand, a synthesis gas that is not contaminated with $CO_2$ and, on the other hand, concentrated $CO_2$. In the prior art, the reactions are not controlled and we therefore have a $CO_2/H_2O/CO/H_2$ mixture during reduction.

DESCRIPTION OF EMBODIMENTS OF THE INVENTION

Figure 1:
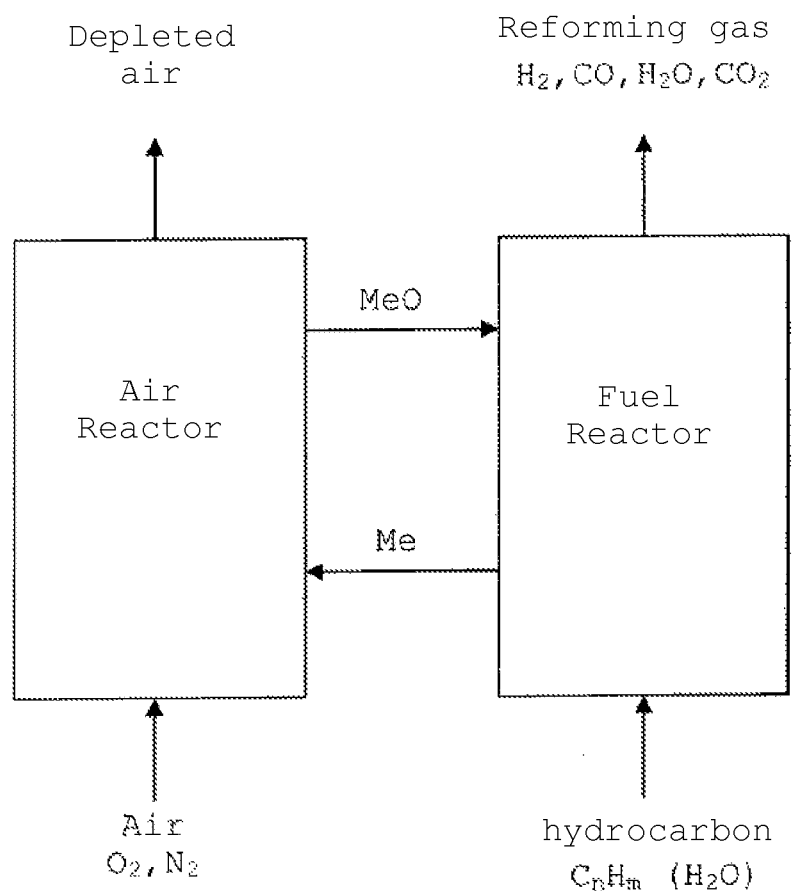
FIG. 1 shows schematically a process according to the prior art.
Figure 2:
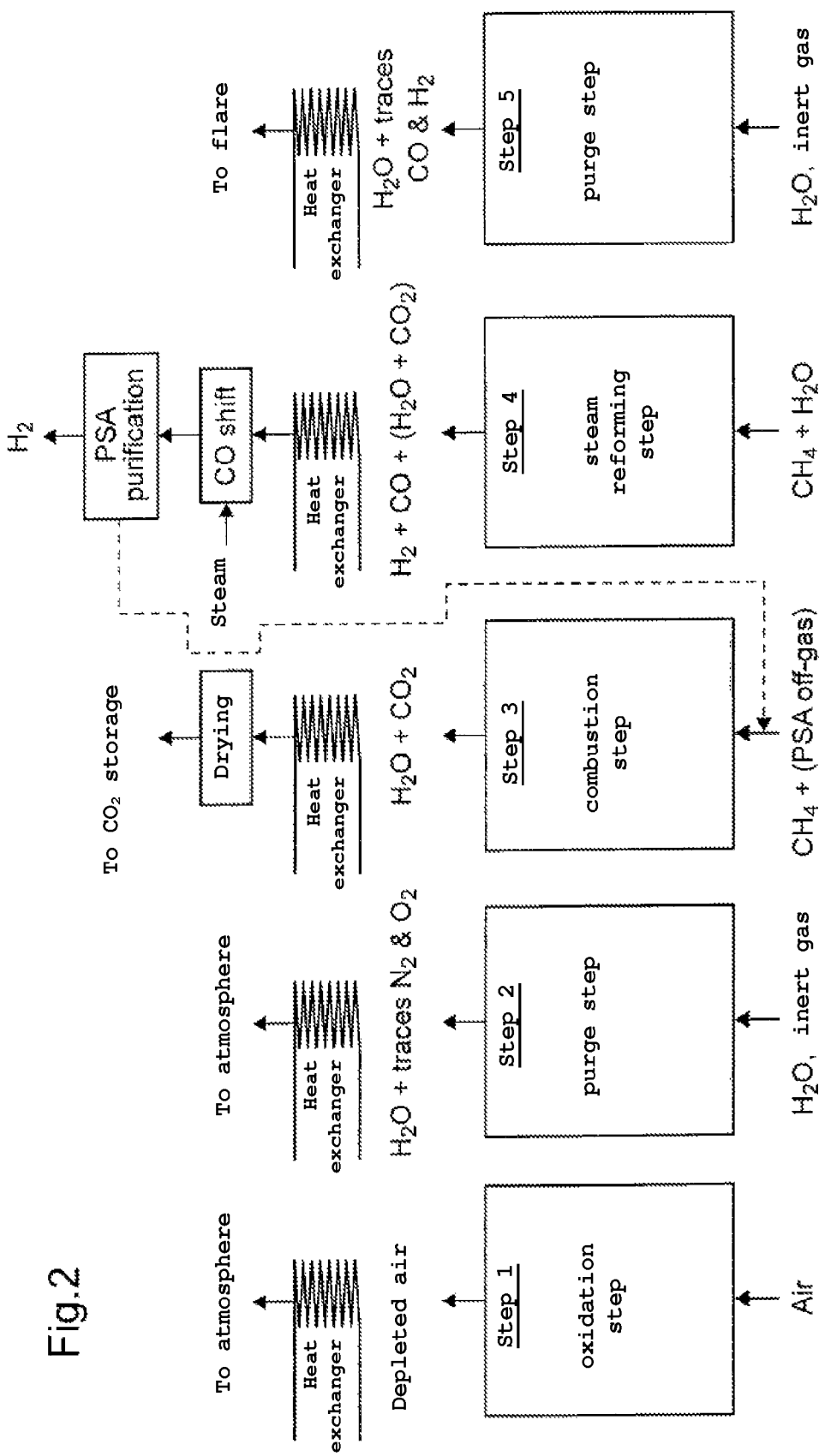
FIG. 2 shows schematically one embodiment of the process according to the invention.

The invention is now described in more detail and non-exhaustively in the following description, referring to FIG. 2, which describes a cyclic process according to the invention.

In the invention, synthesis gas means any mixture of CO and $H_2$, notably in ratios ranging from 1:1 to 1:3.

This process according to the invention comprises the following steps.

Oxidation Step

The first step is the oxidation step. The solid is oxidized during this step. The oxygen-carrying solid can notably contain a metal, whose oxide is reducible, or a sulphur-containing derivative of this metal, said metal being in particular a catalyst of the steam reforming reaction. The metal can be present alone in this step, or optionally mixed with another species (another metal, or sulphur for example) in this step, for example $FeTiO_5$. Examples of metals are as follows: Ni, W, Mn, Rh, Co, Sr, Ba, Pt, Fe, Cu, Mo, Pd and Ag, notably Ni. Possible pairs are as follows: Ni/NiO, Ag/AgO, Cu/CuO, Fe/FeO, Co/CoO, W/WO, Mn/MnO, Mo/MoO, $SrSO_4$/SrS, $BaSO_4$/BaS, preferably Ni/NiO. In general, it is possible to use the solids that are described and used in the documents of the prior art cited above, namely WO-A-96/33794, WO-A-99/11591, WO-A-2008/036902, U.S. Pat. No. 6,797,253 and WO-A-00/00427. A thermally stable inert support can be used as a mixture to increase its heat capacity. An example of thermally stable inert support is alumina or a nickel-alumina spinel ($NiAl_2O_4$), or silica. The description is presented below with reference to the pair Ni/NiO, but it is to be understood that this applies mutatis mutandis to any pair of solids, provided the necessary adjustments are made with respect to the operating conditions.

Another solid, used for its heat capacity, can also be mixed with the oxygen-carrying solid. Said solid forming thermal ballast can be silica, alumina, or sand.

The oxygen-carrying solid can represent from 100% to 1%, preferably from 60 to 5%, preferably from 30 to 10%, of the final mixture (whether the oxygen-carrying solid is supported or simply mixed).

The solid is preferably fluidized by the gas in the reactor in order to take advantage of the properties of homogeneity of a solid in fluidized bed reactors. Although fluidized beds are preferred, fixed beds are also possible, as well as transported beds. In the case of fluidized beds, the particle size and distribution of the solid particles (whether particles of oxygen-carrying solid, particles of supported oxygen-carrying solid or mixtures with a thermal ballast) are selected in a manner known by a person skilled in the art so as to have a fluidized bed in the reaction conditions. As an example, the dv50 of the Ni/NiO particles is between 50 μm and 400 μm, preferably between 50 μm and 200 μm, notably between 70 and 150 μm. The conditions of the fluidized bed are bubbling or turbulent conditions.

Reactors with fluidized bed operation are equipped with conventional means for distributing the incoming gas, conventional means for dedusting gaseous effluents and a pipeline for supplying or withdrawing particles.

The surface velocity of the gas during the various cycles will always be maintained below the minimum velocity of transport of all of the catalytic particles, to avoid entrainment of the latter.

During the oxidation step, the metal is oxidized according to the following reaction:

$$Ni + \tfrac{1}{2}O_2 \rightarrow NiO.$$

This reaction is known per se to be exothermic. The temperature of the oxidation reaction is typically between 700° C. and 1000° C. During this step, the solid stores heat, which will be required subsequently in the endothermic steam reforming reaction.

X denotes the degree of oxidation of the solid at a given time point t, defined as follows:

$$X = \frac{m_{actual} - m_{red}}{m_{ox} - m_{red}}$$

wherein $m_{actual}$ is the mass at time t of the oxygen carrier in its partially oxidized form, and $m_{ox}$ and $m_{red}$ are the masses of the oxygen carrier in its completely oxidized and completely reduced forms, respectively.

The oxidation step makes it possible to obtain a degree of oxidation such that preferably X>0.8. Preferably, at the end of the first oxidation step, X is not equal to 1, to avoid a period of activation of the solid at the start of the combustion step. Preferably, at the end of the oxidation step X is less than 0.99, advantageously less than 0.98.

The degree of oxidation can be measured in various ways. It is possible to use weighing by TGA (ThermoGravimetric Analysis) or determination of the oxygen content from the mass balance. This last-mentioned technique is preferred; we know what is fed into the reactor and we know what leaves it. It is then possible to deduce the amount of oxygen that is fixed or conversely released by the solid in the reactor and then deduce its degree of oxidation. Physical samples can also be taken from time to time.

This oxidation step can be carried out at any industrially compatible pressure, notably a pressure between 1 and 150 bar, preferably from 20 to 100 bar. Advantageously, this step is carried out at a pressure roughly identical to that of the preceding and subsequent steps.

The mass of solid, the flow rate and the duration are adjusted to obtain a desired degree of oxidation. In general, the mass of oxygen-carrying solid is set, the flow rate (which meets industrial requirements) is set, and then the duration of the step is calculated.

The oxidant is typically air; however, it is possible to use oxygen optionally produced by another process available on site. The air used for this oxidation step therefore leaves the reactor in depleted form and is discharged to atmosphere or is used at some other point of the process or in another process.

Purge Step

The second step is a purge step. In fact, a purge step is required before the combustion step, in order to avoid any direct contact between the air and the combustible gas.

Steam can be used as the inert substance, or nitrogen (depleted air), which could for example be produced by another reactor in the oxidation step, or $CO_2$, which could for example be produced by another reactor in the combustion step or could be supplied from storage. This purge gas is characterized by roughly zero content of $O_2$.

This purge step can be carried out at any industrially compatible pressure, notably a pressure between 1 and 150 bar, preferably from 20 to 100 bar. Advantageously this step is carried out at a pressure roughly identical to that of the preceding and subsequent steps.

Combustion Step

The third step is the combustion step. In this step, a fuel is fed into the reactor and will be oxidized practically completely by the oxygen carried by the oxygen-carrying solid.

The fuel can be methane or some other hydrocarbon (preferably gaseous in the reaction conditions), optionally mixed with the residual gas from purification of the synthesis gas by Pressure Swing Adsorption. In this configuration, it is then possible to capture 100% of the $CO_2$ from the plant.

The duration is adjusted to obtain a desired degree of combustion. The mass of oxygen-carrying solid being fixed (see above for the oxidation step for example), we set the flow rate (which meets industrial requirements) and then the duration of the step is calculated. This duration is such that at the end of this step, the degree of oxidation of the solid is generally between 0.4 and 0.2, preferably between 0.35 and 0.25, advantageously about 0.3.

This step is (slightly) endothermic or exothermic (for example in the case of Cu) depending on the nature of the oxygen-carrying solid. For nickel, this step is slightly endothermic.

The main reaction during this step is:

$$CH_4 + 4NiO \rightarrow CO_2 + 2H_2O + 4Ni$$

The gas produced essentially contains $H_2O$ and $CO_2$. After condensation of the water, the $CO_2$ can be compressed and then stored.

The combustible gas can be co-injected with a small amount of steam in order to limit the deposition of carbon on the solid (a phenomenon known as coking, which can lead to at least partial deactivation of the $O_2$ carrier).

This combustion step can be carried out at any industrially compatible pressure, notably a pressure between 1 and 150 bar, preferably from 20 to 100 bar. Advantageously this step is carried out at a pressure roughly identical to that of the preceding and subsequent steps.

Step of Production of Synthesis Gas

The fourth step is the step of production of synthesis gas. During the step of production of synthesis gas, methane is co-injected with steam. The main reaction is then the steam reforming reaction:

$$CH_4 + H_2O \rightarrow CO + 3H_2.$$

This highly endothermic reaction is possible owing to the energy stored by the solid in the oxidation step (and which is only consumed very slightly during the combustion step). This step is stopped when the solid has returned to the original temperature at the start of the first step 1.

The synthesis gas produced can pass through a WGS (Water Gas Shift) reactor (in which the known reaction is $CO + H_2O \rightarrow CO_2 + H_2$) in order to maximize the production of $H_2$. On leaving this conversion reactor, the synthesis gas can be purified conventionally in a PSA (Pressure Swing Adsorption) system, which will produce purified hydrogen and a residual gas containing $CO_2$, $H_2$, CO and $CH_4$ (generally said gas contains about 50% $CO_2$, about 25% $H_2$, about 25% CO and traces of $CH_4$). This gas, called "off-gas", after purification to extract the required hydrogen from it, can be used mixed with fuel (notably methane) for step 3.

A minor reaction may also occur, as the solid is not at a zero degree of oxidation; this reaction is, however, very minor.

$$CH_4 + NiO \rightarrow CO + 2H_2 + Ni$$

The duration of the step (and the other operating parameters) is adjusted so that the final temperature of the solid is roughly equal to the starting temperature during the first step of the process. Preferably, the duration of this step is adjusted to be identical to the duration of the combustion step to permit easy return of the tail gases from the system for purification of the synthesis gas to another reactor in the combustion step.

This step of production of synthesis gas can be carried out at any industrially compatible pressure, notably a pressure between 1 and 150 bar, preferably from 20 to 100 bar. Advantageously this step is carried out at a pressure roughly identical to that of the preceding and subsequent steps.

According to one embodiment, the durations of the steps of combustion and of production of synthesis gas are roughly identical; in this embodiment, the gas from purification containing $CO_2$ is reinjected into the combustion step. This gas from purification then contains $CO_2$, and optionally CO, which can also be converted to $CO_2$.

Purge Step

The fifth phase is a purge step. Before returning to the oxidation step, a purge step is in fact required in order to avoid any direct contact between air and the combustible gas.

It will be possible to use steam as inert substance or nitrogen (depleted air), which could for example be produced by another reactor in the oxidation step, or $CO_2$ which could for example be produced by another reactor in the combustion step or could be supplied from storage. This purge gas is characterized by roughly zero content of $O_2$.

This purge step can be carried out at any industrially compatible pressure, notably a pressure between 1 and 150 bar, preferably from 20 to 100 bar. Advantageously this step is carried out at a pressure roughly identical to that of the preceding and subsequent steps.

To improve thermal integration, a heat exchanger can be positioned at the outlet of effluents from the reactor (for all steps) in order to produce steam (which the system requires) and/or to preheat the feeds to the reactor.

In one variant of the invention, the gaseous hydrocarbon is replaced with a solid, coal. Steps 1, 2 and 5 are identical. Steps 3 and 4 change, now being combustion and gasification respectively.

The combustion step is carried out according to the following main reaction:

$$C+2NiO \rightarrow CO_2+2Ni$$

The $CO_2$ resulting from this reaction is often mixed with water, which is used as fluidization vector.

The gasification step is carried out according to the following main reaction:

$$C+H_2O \rightarrow CO+H_2.$$

In this application, the reactive metal of the solid does not need to have properties of catalysis of the steam reforming reaction (which is not employed), but only to have a reducible oxide.

The solid is entrained in powder form into the bed of solid material, and fluidization can be effected in particular by injection of steam (optionally mixed with $CO_2$). The particle size distribution of the coal is not critical, because when coal is exposed to a high temperature it explodes into small particles, which are easily fluidized. For kinetic reasons, particles of small size will be preferred, preferably below 5 mm and preferably below 500 µm.

The ash produced is managed according to techniques that are conventional in gasification.

In the case when coal is used, a water gas shift (WGS) reaction will not be employed, and advantageously synthesis gas $CO+H_2$ will be produced.

In the case of coal, synthesis gas will then be produced according to the following reaction:

$$C+H_2O \rightarrow CO+H_2.$$

In the case of reforming, synthesis gas can be produced according to the following reaction:

$$CH_4+H_2O \rightarrow CO+3H_2.$$

In the case of production of synthesis gas, the pressure is notably about 80 bar.

In the case of reforming, the CO produced can be converted to $CO_2$ by the WGS reaction according to:

$$CO+H_2O \rightarrow CO_2+H_2$$

Thus, overall, one mole of methane will give four moles of $H_2$ according to the following overall reaction:

$$CH_4+2H_2O \rightarrow CO_2+4H_2$$

Production of hydrogen is therefore generally carried out by methane reforming rather than with coal, which leads to less hydrogen, the ratio of hydrogen to carbon being in favour of methane reforming.

In the case of production of hydrogen, the pressure is notably about 30 bar.

The invention therefore makes it possible to produce synthesis gas, which can then be purified to give hydrogen, optionally with an intermediate step of WGS and a purification step.

Figure 7:
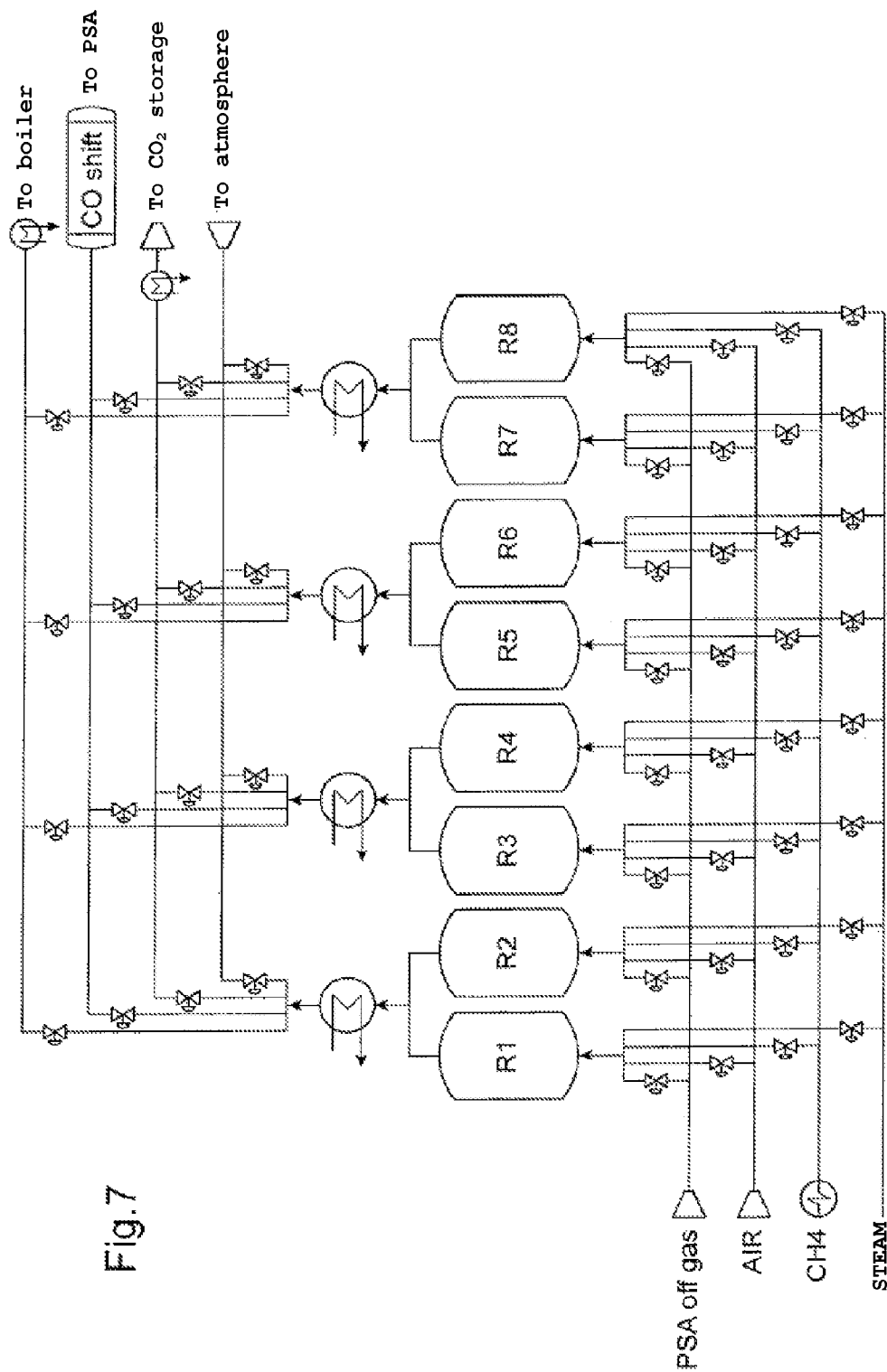
FIG. 7 shows the arrangement of the reactors used in example 3.
Figure 8:
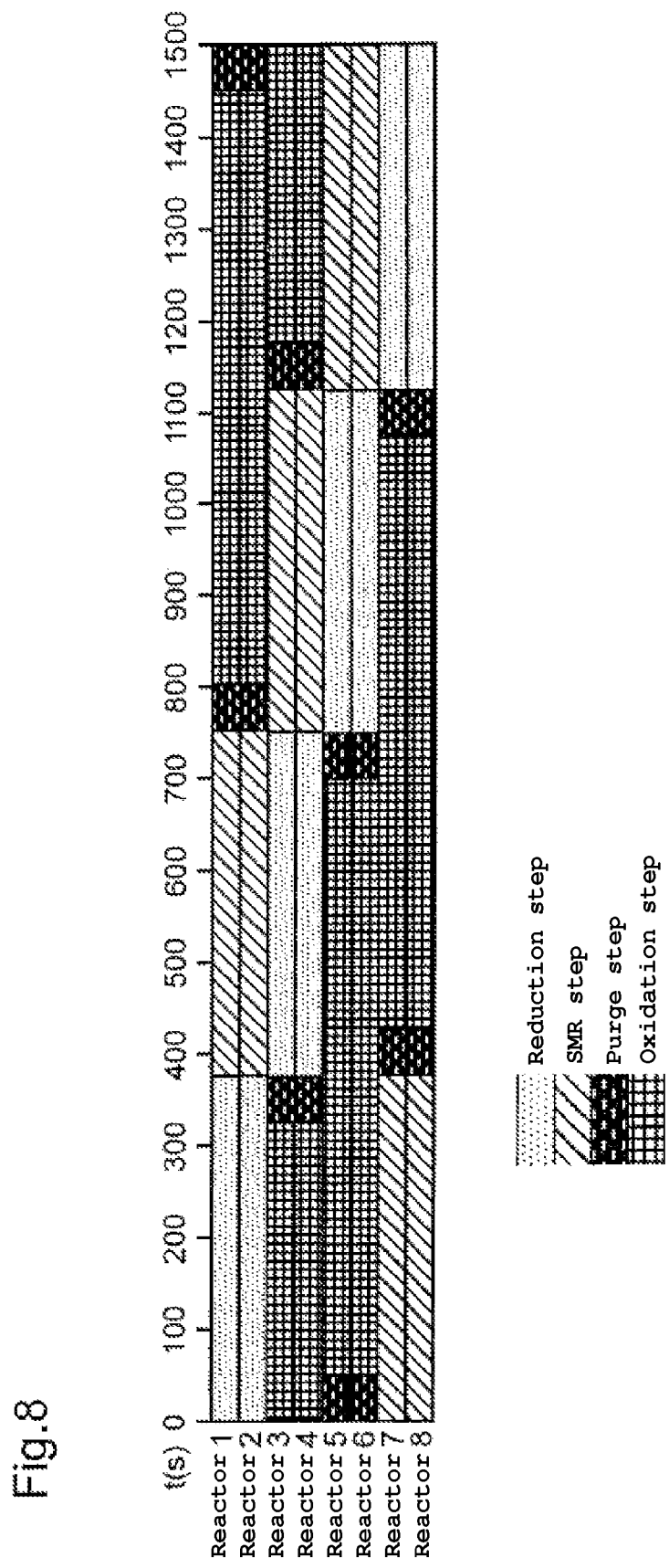
FIG. 8 shows a time chart of the use of the reactors for a cycle of 1500 seconds used in example 3.

To obtain continuous production, several reactors can be used in parallel, so that there is always at least one of them in the reforming step. A turntable can be provided for carrying out rotation of the reactors. It is also possible to envisage a reactor with a rotating interior, the reaction zones being divided into sections inside the reactor. Conventionally, the reactors are linked by a system of valves ("manifolding"). FIG. 7 shows such a system of valves employing 8 reactors. Taking into account the different durations in the different steps, several reactors can be provided associated with a particular step, with offset of the inlets/outlets at the level of the various reactors. FIG. 8 shows the offset of the reactors for a complete cycle.

The invention offers many advantages relative to the prior art, besides those already mentioned above.

Depending on the embodiment adopted, the invention offers one or more of the following advantages:

The $CO_2$ is captured during the combustion step. Even relative to gasification, the invention avoids generating diluted $CO_2$, which is generally produced by the associated external combustion step.

Recycling of the "PSA offgas" to the combustion step. This makes it possible to capture all of the $CO_2$.

Use of a fluidized bed reactor in batch mode. In this batch mode there is no solid circulating between 2 reactors having different operating conditions, instead the solid remains in just one reactor, whose operating conditions change over time. This makes it possible to control the level of oxidation of the solid. The conditions of homogeneity of the solid in this type of reactor ensure that all the particles have the same degree of oxidation, which is not the case with fixed beds or circulating fluidized beds.

Transition from the combustion mode to reforming/gasification is based on control of the degree of oxidation, for example with a pivot value of X=0.3.

The reactor in batch mode permits easy pressurization, which is not possible when using reactors with circulating fluidized beds. This makes it possible to carry out the various steps and notably that of steam reforming at high pressure, making it possible to produce a synthesis gas (or hydrogen) at high pressure, usable directly in the industrial unit.

EXAMPLES

The following examples illustrate but do not limit the invention.

Example 1

In this example, a reactor is used containing 200 g of solid, composed, in percentages by weight, of 60% of active NiO and 40% of $NiAl_2O_4$ support as powder with an average particle diameter of 200 μm. The reactor consists of a quartz tube with inside diameter of 4.6 cm in which the solid is fluidized by a gas distributor positioned at the bottom of the reactor and consisting of a porous matrix of sintered quartz.

The temperature of the reactor is measured by means of a thermocouple immersed directly in the bed of fluidized solid. This temperature was controlled to 800° C. in the example by means of heating shells positioned around the reactor.

The solid is then exposed to cycles of oxidation-reduction. The fuel used for the reductions is a mixture of 10% methane diluted in argon (inert gas) and re-oxidation is carried out with a mixture of 21.1% of oxygen diluted in argon. The reactor is purged with argon between each cycle.

The flow rates of the gases are controlled by flow regulators, and water is injected by means of a pump. Before they enter the reactor, the gases are preheated by an exchanger consisting of a fluidized bed of sand with controlled temperature, through which the reactor feed tube passes. Water injected upstream is then vaporized before entering the reactor.

Figure 3:
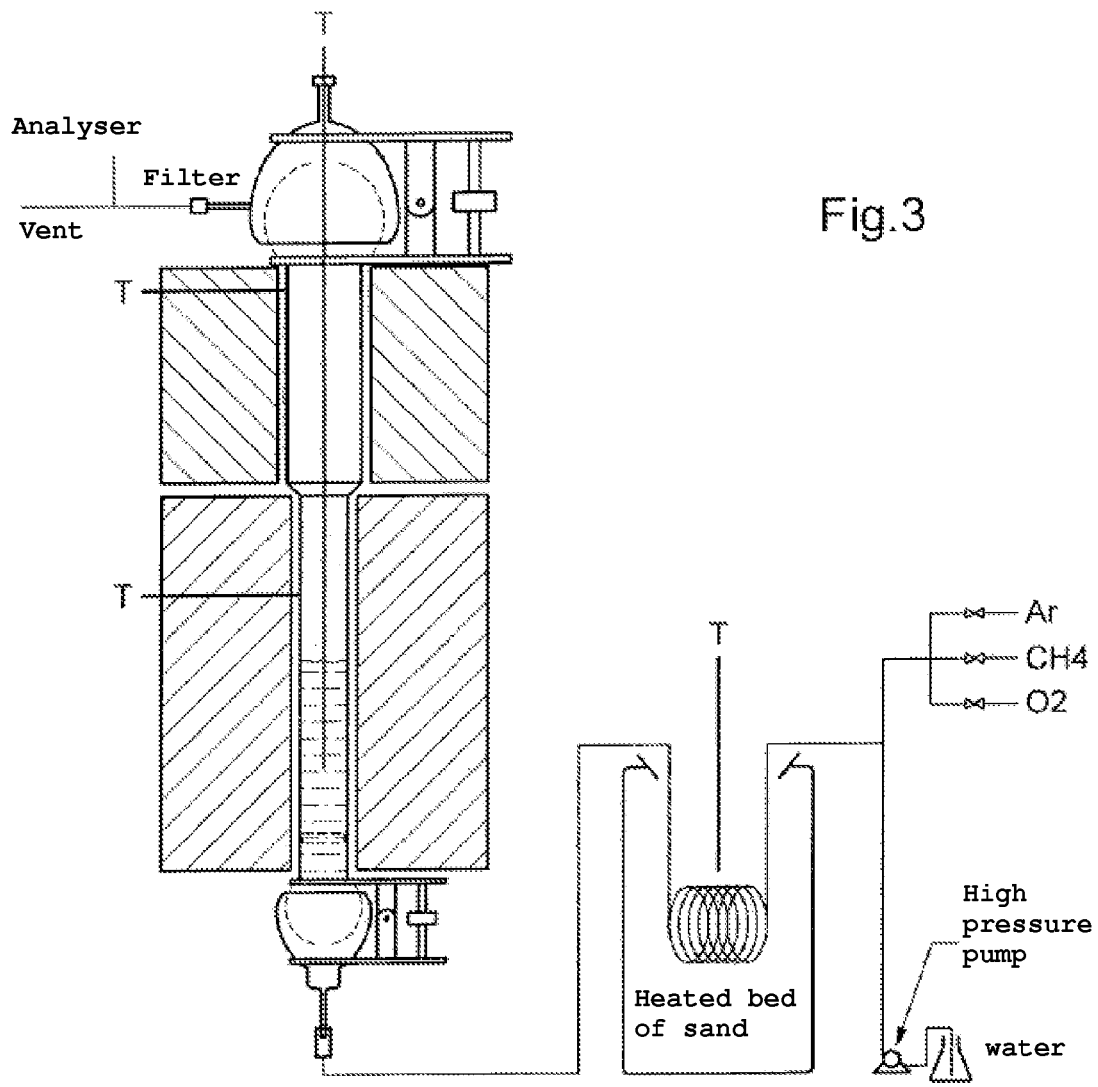
FIG. 3 shows schematically the reactor used in example 1.

The device is shown in FIG. 3.

The composition of the gases (in vol. %) at reactor outlet during a reduction step is measured by means of a mass spectrometer.

The reduction step has been divided into 2 steps:
from t=0 to t=100 min, a flow rate of 600 Nml/min of a mixture composed of 10 vol. % $CH_4$+90 vol. % Ar is sent to the reactor. The initial degree of oxidation is 0.95, and at the end of this step it is 0.3. This is the combustion step, producing $CO_2$ and $H_2O$
from t=100 min to t=430 min, a flow rate of 600 Nml/min of a mixture composed of 9.2 vol. % $CH_4$+10 vol. % $H_2O$+80.8 vol. % Ar is sent to the reactor. This is the reforming step, producing $H_2$ and CO.

During the combustion step, analysis of the gases at the outlet clearly shows that the reaction

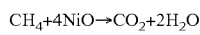

is the main reaction. The main reaction products are $CO_2$ and $H_2O$.

During the reforming step, analysis of the gases at the outlet clearly shows that the reaction

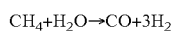

is the main reaction. The main reaction products are $H_2$ and CO.

Figure 4:
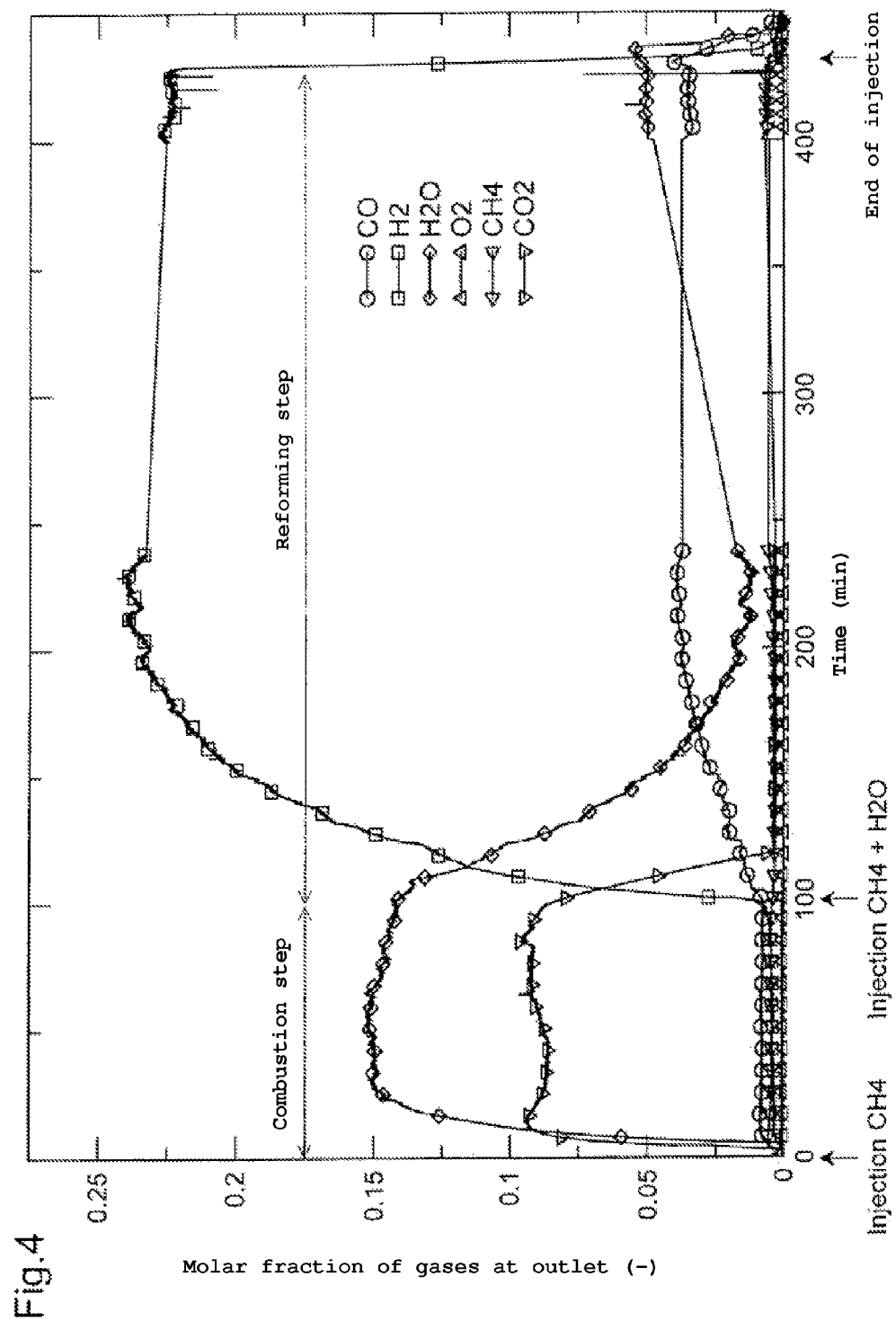
FIG. 4 shows the profiles of the effluents obtained in example 1.

The profile of the gases at the outlet is given in FIG. 4.

Example 2

In this example, a microreactor is used containing 200 mg of solid composed (in wt. %) of 60% of active NiO and 40% of $NiAl_2O_4$ support in powder form with an average particle diameter of 200 μm. The reactor consists of a quartz tube with inside diameter of 4 mm, in which the solid is supported on a plug of glass wool placed at the middle of the reactor. A descending gas flow passes through the bed of solid, which therefore behaves as a fixed bed. The tube is placed in a furnace, the temperature of which is controlled to 800° C. by means of a thermocouple positioned 10 mm above the catalyst powder. The solid is then exposed to cycles of oxidation-reduction. The fuel used for the reductions is a mixture of 10% methane diluted in argon (inert gas) and re-oxidation is carried out with a mixture of 21.1% of oxygen diluted in argon. The reactor is purged with argon between each cycle.

Figure 5:
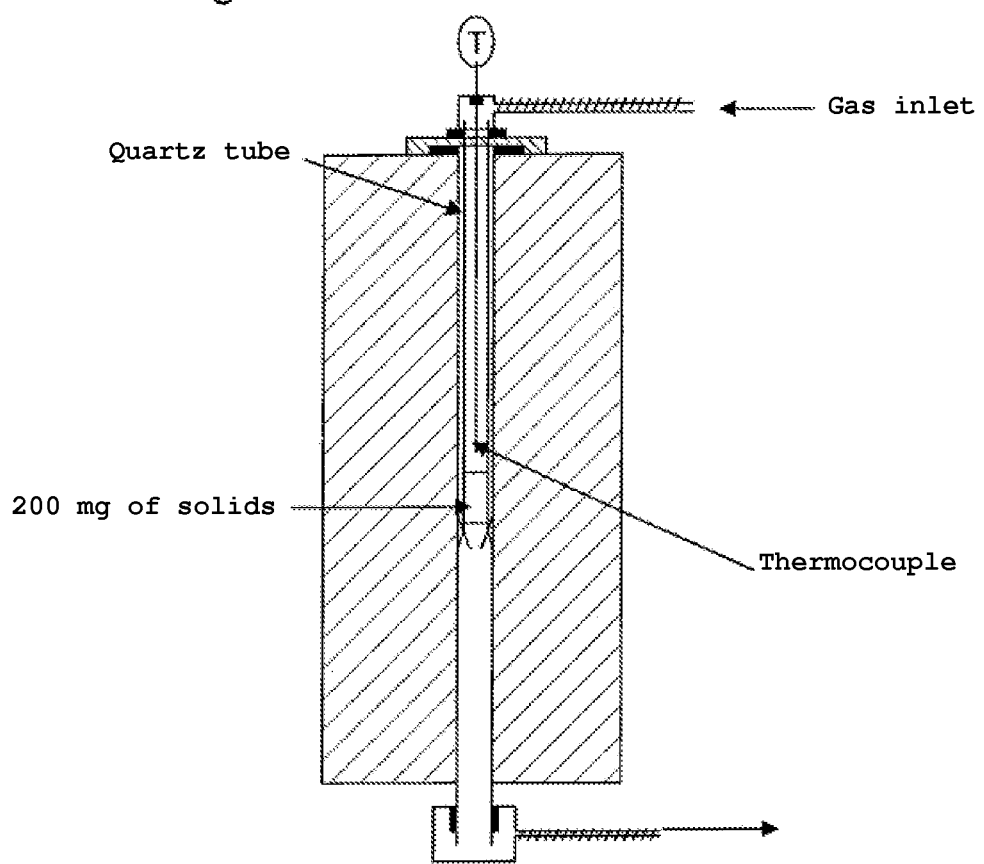
FIG. 5 shows schematically the reactor used in example 2.

The device is shown in FIG. 5.

Figure 6:
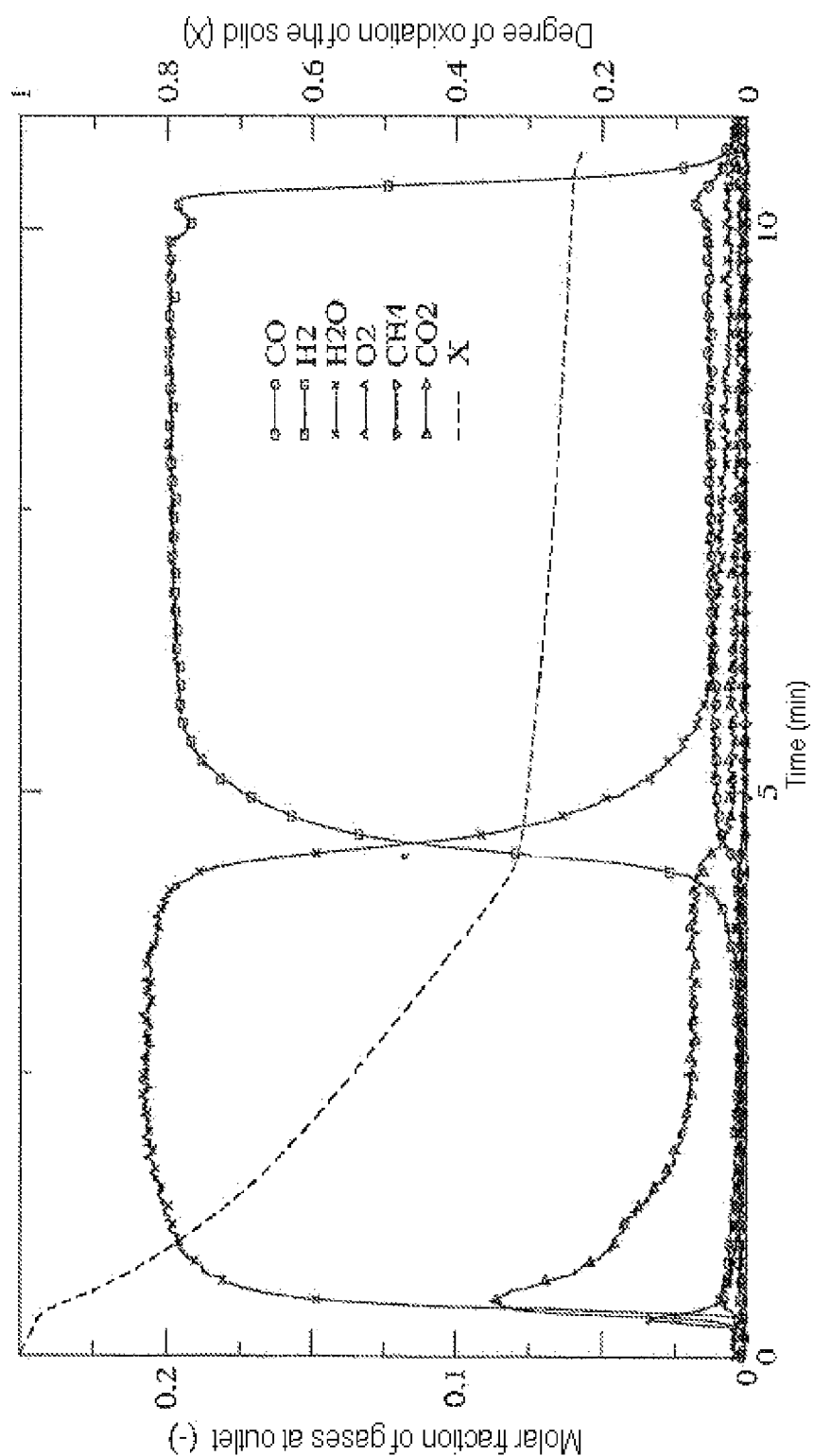
FIG. 6 shows the profiles of the effluents obtained in example 2.

FIG. 6 shows the composition of the gases (in vol. %) at reactor outlet during a reduction step, measured by means of a mass spectrometer. During this phase, the flow of reducing gas (90% Ar+10% $CH_4$) is controlled to 50 Nml/min. Before it enters the reactor, this gas is bubbled through a water container at controlled temperature in order to saturate it with water at a level of 8 vol. %.

The degree of oxidation of the solid, as defined previously, is calculated on the basis of the analysis of the gases at the outlet, from the mass balance, and is also shown in FIG. 6.

The present example shows that the solid acts differently depending on its degree of oxidation:
X>0.30, production of $H_2O$ and $CO_2$ is favoured, and this minimum degree of oxidation will be used for the combustion step;
for X<0.30, production of $H_2$ and CO is favoured, and this maximum degree of oxidation will be used for the steam reforming step.

The small breakthrough of methane at the start of injection is due to starting the experiment with solid oxidized to 100% (this would not have been the case if the experiment had started with a degree of oxidation of 95% as in the preceding example).

Example 3

In this example, a set of 8 reactors is used, each containing 216 tonnes of a solid composed in its 100% oxidized form of 20 wt. % of NiO and 80 wt. % of $Al_2O_3$. These reactors are operated using a system of valves as described in FIG. 7, making it possible to have at any time 2 reactors in the reforming step and 2 in the combustion step. The time diagram of the operation of the 8 reactors is shown in FIG. 8 for a complete cycle of 1500 s.

Throughout the steps, the reactors are supplied at an inlet pressure of 32 bar.

The duration of the combustion step is fixed at 375 seconds. During this step, each reactor is supplied with a mixture containing 25% $CH_4$, 14% $H_2$, 12% CO and 49% $CO_2$, to give a flow rate of 2876 kmol/h. This mixture is constituted by recycling the gases from purification of the hydrogen and a supply of fresh methane. The feed temperature is 435° C. When the step begins, the initial temperature of the solid is 1100° C. and its degree of oxidation is 0.95. At the end of the step, the temperature of the solid is 975° C. and its degree of oxidation is 0.3. At reactor outlet, the gases only contain $H_2O$ and $CO_2$. These gases are cooled by passing them through a steam-generating recuperating boiler, then they are dried and the $CO_2$ produced (2476 kmol/h per reactor) can be sent for geological storage.

The reforming step therefore starts with an initial temperature of the solid of 975° C. and a degree of oxidation of 0.3. The duration of this step is also fixed at 375 s so that there are always 2 reactors in the reforming step and 2 reactors in the combustion step. During this stage, the reactors are supplied with a mixture containing 47% of $CH_4$ and 53% of $H_2O$, for a flow rate of 7525 kmol/h per reactor. The feed temperature is 223° C. At the end of the step, the temperature of the solid is 721° C. The synthesis gas produced is cooled by being passed through a steam-generating recuperating boiler, then saturated with steam before being sent to a CO-Shift reactor. The gas rich in $H_2$ leaving this reactor will be dried and purified. The resultant production of hydrogen is 6298 kmol/h per reactor or 12596 kmol/h continuously as only 2 reactors are in the reforming step simultaneously. During this stage, the degree of oxidation remains at 0.3.

At the end of the reforming step the reactors are purged with steam at 250° C. for 50 s for a flow rate of 7000 kmol/h per reactor. The temperature of the solid then drops to 713° C. The purge gas produced is cooled by being passed through a steam-generating recuperating boiler, then the water is condensed and the non-condensable gases are sent to synthesis gas purification.

During the oxidation step, the reactors are supplied with compressed air at 32 bar and a temperature of 529° C. Each reactor is supplied with a flow rate of 4956 kmol/h of air for 650 seconds. When the step begins, the initial temperature of the solid is 713° C. and its degree of oxidation is 0.3. At the end of the step, the temperature of the solid is 1113° C. and its degree of oxidation is 0.95. At reactor outlet, the depleted air is cooled by being passed through a steam-generating recuperating boiler, then expanded through a turbine for producing the electricity required for compression of the air upstream of the reactors.

At the end of the reforming step and before a new combustion step, the reactors are purged with steam at 250° C. for 50 seconds for a flow rate of 6000 kmol/h per reactor. The temperature of the solid then drops to 1100° C., the initial temperature of the next combustion step. The purge gas produced is cooled by being passed through a steam-generating recuperating boiler, and is then discharged to atmosphere.

Thus, the arrangement of these 8 reactors according to the cycle described makes it possible to produce, continuously, 25.39 t/h of $H_2$ (12596 kmol/h) while capturing 100% of the $CO_2$ emissions associated with the process, or 217.98 t/h of $CO_2$ (4952 kmol/h). Moreover, the use of recuperating boilers makes it possible to produce the steam required for the process and moreover to have an average surplus of 55 t/h of steam at 32 bar and 250° C.

The invention claimed is:

1. A cyclic process for producing synthesis gas comprising, successively:
  a - first, oxidizing an oxidizable solid thereby forming an oxidized heated oxygen carrier solid;
  b - second, purging;
  c - third, combustion producing $CO_2$ thereby forming a reduced heated oxygen carrier solid;
  d - fourth, producing synthesis gas;
  e - fifth, purging
    wherein combustion (c) is carried out with the oxygen of the oxidized heated oxygen carrier solid and production (d) of synthesis gas is carried out with the heat of the reduced heated oxygen carrier solid.

2. The process according to claim 1, wherein (d) production of synthesis gas comprises a steam reforming reaction and the oxygen-carrying solid is a catalyst of the steam reforming reaction.

3. The process according to claim 1, wherein (c) combustion is carried out with methane.

4. The process according to claim 1, wherein (d) production of synthesis gas is a gasification step.

5. The process according to claim 1, wherein (c) combustion is carried out with coal.

6. The process according to claim 1, carried out in a fluidized bed.

7. The process according to claim 1, wherein the solid is associated with a thermally stable support or mixed with said support.

8. The process according to claim 1, wherein the solid contains a metal that is Ni, W, Mn, Rh, Co, Sr, Ba, Pt, Fe, Cu, Mo, Pd, Ag, or mixtures thereof.

9. The process according to claim 1, wherein the oxidation is carried out up to a degree of oxidation above 0.8.

10. The process according to claim 1, wherein combustion (c) is carried out up to a degree of oxidation between 0.4 and 0.2.

11. The process according to claim 1, further comprising a water gas shift reaction of the carbon monoxide resulting from (d) production of synthesis gas to a mixture of $CO_2$ and $H_2$.

12. The process according to claim 1, further purification of $H_2$.

13. The process according to claim 11, further comprising recycling of $CO_2$ to combustion (c).

14. The process according to claim 1, further comprising drying of gases resulting from combustion step (c).

15. The process according to claim 1, wherein (a)-(e) of the process are carried out at roughly the same pressure, at a pressure from 1 to 150 bar.

16. The process according to claim 1, further comprising heat recovery from reactor effluents.

17. The process according to claim 1, carried out continuously in a plurality of reactors in parallel.

18. The process according to claim 2, wherein (c) combustion and/or (d) steam reforming is carried out with methane.

19. The process according to claim 4, wherein (c) combustion and/or (d) gasification is carried out with coal.

20. The process according to claim 12, further comprising recycling of $CO_2$ to combustion (c).

* * * * *

UNITED STATES PATENT AND TRADEMARK OFFICE
CERTIFICATE OF CORRECTION

PATENT NO. : 8,974,699 B2  
APPLICATION NO. : 13/580541  
DATED : March 10, 2015  
INVENTOR(S) : Rifflart et al.

Page 1 of 1

It is certified that error appears in the above-identified patent and that said Letters Patent is hereby corrected as shown below:

In the Claims,

Column 12, line 39 reads "drying of gases resulting from combustion step (c)." should read -- drying of gases resulting from combustion (c). --

Signed and Sealed this  
Thirtieth Day of June, 2015

Michelle K. Lee  
*Director of the United States Patent and Trademark Office*